United States Patent Office 3,367,916
Patented Feb. 6, 1968

3,367,916
COPOLYMERS OF TRIOXANE
Wolfgang von der Emden, Ernst-Ulrich Köcher, and Kuno Wagner, Leverkusen, and Karl-Heinz Heller, Krefeld, Germany, assignors to Farbenfabriken Bayer Aktiengesellschaft, Leverkusen, Germany, a German corporation
No Drawing. Filed Sept. 15, 1964, Ser. No. 396,759
Claims priority, application Germany, Oct. 26, 1963, F 41,115
4 Claims. (Cl. 260—67)

Processes are known by which trioxane, the cyclic trimer of formaldehyde, can be converted into linear high molecular weight polyoxymethylenes. The homopolymers of trioxane are broken down easily and quantitatively into monomeric formaldehyde by heat treatment or by the influence of catalytic quantities of acids or alkalies.

The stability of polyoxymethylenes can be improved by etherification or esterifications but a complete reaction of the end groups cannot be carried out easily as there is no known solvent which will dissolve polyoxymethylenes at low temperatures and at high temperatures thermal degradation sets in especially in the etherification reaction.

Better results are obtained if in the polymerisation comonomers are incorporated which ensure that the chains will not consist exclusively of formaldehyde units but will have ether units dispersed among them. The comonomers are incorporated statistically. If only a small percentage is used then the chain ends will generally be acetalic. Formaldehyde is split off from such copolymers by the action of alkali or by heat treatment, but the degradation comes to a standstill when an ether unit of the comonomer has become an end group.

The most usual comonomers are epoxides, cyclic formals of aliphatic diols and hydroxymercaptans such as 1,3-dioxolane and 1,3-oxothiolane which, as acetals, are similar in behaviour to trioxane. Like trioxane, they can be polymerised with cationic catalysts and form copolymers in any proportions with trioxane.

The tendency to polymerisation varies with the individual acetals and is always less than in trioxane. Under the influence of cationic catalysts, polymerisation of trioxane alway proceeds more slowly in the presence of additional comonomers than does homopolymerisation, the speed of polymerisation decreasing with increasing quantities of the mentioned comonomers.

The comonomers added influence not only the reaction velocity but also the molecular weights of the polymers obtained. The molecular weights of the copolymers are always less than those of the homopolymers produced under the same conditions, and the molecular weights decrease with increasing proportion of comonomers, the individual comonomers varying in the amount of influence they exert.

In order to obtain polymers with a wide variety of properties, it is desirable to produce polyoxymethylenes with greatly differing concentrations of comonomers. For example, with increasing concentartion of the comonomers, the melting point drops so that a lower temperature can be employed in processing.

However, there are limits to this raising the amounts of comonomers because from a certain concentration of comonomers, the molecular weights fall below values that are of technical interest. For example, it is not possible to incorporate more than 6% by weight of dioxolane if the intrinsic viscosity $\eta_1$ is to be greater than 0.6 (measured on solutions of 0.5% by weight in butyrolactone at 150° C.) which corresponds to a molecular weight of about 30,000. For oxothiolane, the concentration above which this molecular weight can no longer be obtained lies at 3% by weight.

It has now been found that copolymers of trioxane having a molecular weight above 30,000 (corresponding to an intrinsic viscosity $\eta_1 > 0.6$, measured in 0.5% by weight solutions in butyrolactone at 150° C.) and a comonomer content up to 10% by weight, can be obtained if the comonomer used is the cyclic formal of triethylene glycol, which may also be named 1,3,6,9-tetraoxacyclo-undecane. Even when a lower concentration of comonomers is desired, the new comonomer can be used advantageously because it enables higher molecular weights to be obtained at the same comonomer-concentration than was possible with the previously known comonomers. The lowest content of 1,3,6,9-tetraoxacyclo-undecane useful in this invention is about 0.5% by weight based on trioxane.

The production of copolymers of trioxane and 1,3,6,9-tetraoxacyclo-undecane follows the known polymerisation process for trioxane and copolymers of trioxane. It can be carried out in bulk, in solution or, preferably, in suspension in an organic liquid in which trioxane has only limited solubility, for example in aliphatic hydrocarbons having more than 10 and up to about 25 carbon atoms or mixtures thereof. The following are examples of suspension agents that may be used: Dodecane, heptamethylnonane, hydrogenated trimeric isobutylene and crude paraffin wax. If polymerisation is carried out in solution then benzene, toluene, cyclohexane and chlorinated hydrocarbons may be used as solvents. If polymerisation is carried out in bulk, the trioxane is melted and mixed with the comonomer and an initiator is added. In all cases temperatures above 40° C. and up to 120° C. are employed, preferably temperatures between 65 and 100° C. The following may be added as cationic initiators: Lewis acids such as boron fluoride or its addition products with diethyl ether, di-n-butylether, tetrahydrofuran or formamide, also trialkyl-oxonium salts such as triethyl-oxonium fluoborate and carbonium salts such as diethoxy-carbonium fluoborate, phenyldimethoxy-carbonium fluoborate, diethoxy-carbonium hexachloroantimonate or 2-methyl-dioxolenium fluoborate. These initiators are used in quantities of 0.001 to 1 percent by weight calculated on the trioxane.

The excellent thermostability of the copolymers is imparted to them only after a chemical and heat treatment in which the catalyst is removed and formaldehyde which can easily be split off is separated from the ends of the chains. This may suitably be done by suspending the crude polymer for some hours in aqueous sodium hydroxide, boiling under reflux and then maintaining at a temperature of 190 to 200° C. in an atmosphere of $N_2$ until there is no further evolution of gas from the melt.

Copolymers having different concentrations of 1:3:6:9-tetraoxacyclo-undecane all may be prepared according to the purpose for which they are intended. Polymers containing 0.5 to 10% by weight of 1:3:6:9-tetraoxacyclo-undecane and having molecular weights above 30,000 are used as thermoplastic materials for the production of moulded articles by injection moulding or of fibres by melt spinning.

Copolymers having a higher content in 1:3:6:9-tetraoxacyclo-undecane (up to 90%) are important as intermediate products or auxiliary substances in the field of synthetic resins. Both types are distinguished from copolymers of trioxane with smaller ringed compounds by their better thermostability since the triethylene glycol end group is more stable than a shorter end group which can be split off by ring formation.

Another important use of the new comonomers lies in their copolymerisation with trioxane in mixtures containing further acetals or thioacetals. Especially valuable are copolymers of trioxane, oxothiolane and 1:3:6:9-tetraoxacyclo-undecane; compared with copolymers of trioxane and oxothiolane, they have the advantage that at the same or a higher molecular weight, they have a lower rate of degradation till a stable product is obtained whilst still containing thioacetal groups as stabilising additives.

The same applies to copolymers of trioxane and 1:3:6:9-tetraoxacyclo-undecane with epoxides, ethylene sulphides, dioxolane, dithiolane, 1:3-dioxa-6-thiocyclooctane, 1:3:6-trioxacyclooctane, vinyl methyl ether, styrene and acrylonitrile.

*Example 1*

0.1 ml. of a 10% solution of borofluoride-etherate in ether is added to a mixture of 50 g. of trioxane and 5 g. of 1:3:6:9-tetraoxacyclo-undecane at 75° C. The melt reacts and within 5 minutes forms a hard block. This is broken up, washed with methylene chloride and dried. Yield 46 g. of a polymer which melts at 162–163° C. and has an internal viscosity of $\eta_i=0.67$ measured in butyrolactone at 150° C. The product is boiled in 500 ml. of 5% aqueous sodium hydroxide to which 50 ml. of n-propanol are added as wetting agent, and the finely powdered product is boiled under reflux for 4 hours. A weight loss of 13% occurs and a stable product is obtained which loses 1.0% of formaldehyde per hour at 222° C. in a nitrogen atmosphere.

*Example 2*

500 g. of trioxane and 27 g. of 1:3:6:9-tetraoxacyclo-undecane are emulsified in 500 ml. of heptamethylnonane at 70° C. 0.2 ml. of $BF_3$-etherate is added. The temperature rises to 82° C. in 30 minutes. At the same time, the emulsion goes over into a suspension. This is left to cool down to 70° C. and the reaction is left to proceed for a total of 5 hours. The reaction product is separated by suction filtration and washed with methylene chloride. Yield 421 g. of a product of M.P. 165–167° C. and internal viscosity $\eta_i=0.79$ measured in butyrolactone at 150° C. To obtain a thermostable product, it is suspended in sodium hydroxide and boiled under reflux for 4 hours and kept for one hour at 200° C. and 15 mm. Hg until no further gas is given off from the melt. During this process, there is a total weight loss of 20%. The resulting product has the same thermostability as that described in Example 1.

*Example 3*

0.1 ml. of a 10% solution of boron fluoride-etherate in ether is added to a mixture of 50 g. of trioxane, 0.75 g. of oxothiolane and 4.25 g. of 1:3:6:9-tetraoxacyclo-undecane at 75° C. The melt gradually becomes stiffer and finally hardens to form a solid block. This is left at 70° C. for 5 hours and then broken up and washed with acetone. Yield 44 g. of a polymer which melts at 155–158° C. and has an internal viscosity of $\eta_i=0.60$ (measured at 150° C. in butyrolactone). In the course of the degradation in 5% aqueous sodium hydroxide, the weight decreases by 12% in 8 hours. Thereafter, the product undergoes an hourly weight loss of 0.55% at 222° C.

*Example 4*

500 g. of trioxane and 50 g. of 1:3:6:9-tetraoxacyclo-undecane are emulsified in 500 ml. of heptamethylnonane at 70° C. After the addition of 0.15 ml. of the addition product of boron trifluoride and tetrahydrofuran, the temperature rises to 92° C. in 10 minutes. The reaction mixture is cooled down to 70° C. within 30 minutes. The emulsion goes over into a suspension. The mixture is left to react for a total of 5 hours and the product is then separated by suction filtration and washed with methylene chloride. Yield 490 g. of a product of M.P. 168° C. and internal viscosity $\eta_i=0.72$ measured at 150° C. in a 0.5% solution in butyrolactone. To obtain a stable product, the substance in the form of a suspension in 5% aqueous sodium hydroxide is kept under reflux for 5 hours, 6% of the polymer going into solution. The resulting product undergoes an hourly weight loss of 1.2% at 222° C.

*Example 5*

300 mg. of 2-methyl-1:3-dioxolenium fluoborate are added to an emulsion of 500 g. of trioxane and 60 g. of 1:3:6:9-tetraoxacyclo-undecane in 500 ml. of heptamethylnonane at 70° C. In spite of vigorous external cooling, the temperature rises to 100° C. in 2 minutes. The suspension goes over into an emulsion; this is cooled to 70° C. and left to polymerise at this temperature for 5 hours. 534 g. of a product of M.P. 169° C. and internal viscosity $\eta_i=0.53$ are obtained. A stable product is obtained after 2 hours treatment with 5% aqueous sodium hydroxide under reflux and one hour's heating to 220° C. in an atmosphere of $N_2$, a total of 8% of the product being decomposed. The thermostability is then characterized by weight loss of 0.1% per hour at 222° C.

*Example 6*

If 150 mg. of 2-methyl-1:3-dioxolenium-fluoborate are used in Example 5 then polymerisation proceeds less vigorously; the temperature rises to 94° C. in the first 5 minutes without cooling. After 5 hours' reaction at 70° C., 508 g. of a product of M.P. 167° C. and internal viscosity $\eta_i=0.51$ is obtained. The losses amount to 7% until a stable product is obtained.

*Example 7*

300 g. of trioxane, 6 g. of 1:3-oxothiolane and 10.8 g. of 1:3:6:9-tetraoxacyclo-undecane are emulsified in 300 ml. of heptamethylnonane at 67° C. After the addition of 0.16 ml. of boron trifluoride-dibutylether adduct, the mixture is left to react for 3½ hours and there are obtained 210 g. of a polymer having a sulphur content of 0.35% and an internal viscosity $\eta_i=0.67$. 10% are decomposed during 10 hours' treatment in 5% aqueous sodium hydroxide under reflux. The resulting product has a weight loss of 0.44% per hour at 222° C.

*Example 8*

350 g. of trioxane, 5.25 g. of 1:3-oxothiolane and 12.6 g. of 1:3:6:9-tetraoxacyclo-undecane are emulsified in 350 ml. of heptamethylnonane. 0.23 ml. of ortho-ethylbenzoate and 0.14 ml. of boron trifluoride-dibutylether adduct are added at 75° C. and the mixture left to react for 5 hours at this temperature. 243 g. of a polymer are obtained which has an internal viscosity $\eta_i=0.74$. If the product is suspended in 5% aqueous sodium hydroxide and left for 10 hours at 95° C., it loses 10% of its weight and thereafter it undergoes a weight loss of 0.55% per hour at 222° C.

*Example 9*

500 g. of trioxane, 27 g. of 1:3:6:9-tetraoxacyclo-undecane and 0.35 g. of 1:3-dioxane-6-thiacyclooctane are emulsified in 500 ml. of heptamethylnonane at 70° C. After the addition of 0.3 ml. of boron trifluoride-tetrahydrofuran adduct, the mixture is heated to 95° C. and left to react for 5 hours at this temperature. 416 g. of a polymer of internal viscosity $\eta_i=0.42$ are obtained.

The product is kept under reflux for 4 hours in 5% sodium hydroxide solution and then kept for 2 hours at 222° C. in an atmosphere of $N_2$, a total of 19% being decomposed during this treatment. The resulting material loses 0.74% by weight per hour at 222° C.

*Example 10*

0.25 ml. of boron trifluoride-tetrahydrofuran is added at 85° C. to an emulsion of 500 g. of trioxane, 6.7 g. of 1:3:6:9-tetraoxacyclo-undecane and 2.2 g. of 1:3-dioxa-6-thia-cyclooctane in 500 ml. of heptamethylnonane, and this mixture is left to react at this temperature for 2 hours and thereafter at 70° C. for 3 hours. 305 g. of a product having a sulphur content of 0.19% and internal viscosity $\eta_i=0.53$ are obtained. When broken down as in Example 1, the substance loses 37% of its weight. Its thermostability is then characterised by a loss of 0.20% per hour at 222° C.

*Example 11*

300 mg. of 2-methyl-1:3-dioxolenium-fluoborate are added at 85° C. to an emulsion of 500 g. of trioxane, 9 g. of 1:3:6:9-tetraoxacyclo-undecane and 1.1 g. of 1:3-dioxan-6-thiacyclooctane in 500 ml. of heptamethyl-nonane and the mixture is left to react at 85° C. for 2 hours and at 70° C. for 3 hours. 414 g. of a polymer are obtained which, on degradation as in Example 9, loses 45% in weight. The thermostability at 222° C. is given by a loss of 0.18% per hour. The substance contains 0.028% of sulphur and has the internal viscosity $\eta_i=0.61$.

We claim:
1. A copolymer of trioxane having incorporated therein, in polymerized form, 99.5–90% by weight of trioxane and 0.5–10% by weight of 1,3,6,9-tetraoxacyclo-undecane.
2. The copolymer of claim 1 which contains, in polymerized form, 0.5–2% by weight, based on the trioxane, of oxathiolane.
3. The copolymer of claim 1 which contains 500 parts by weight of trioxane and 27 parts by weight of 1,3,6,9-tetraoxacyclo-undecane.
4. The copolymer of claim 1 which contains 500 parts by weight of trioxane and 50 parts by weight of 1,3,6,9-tetraoxacyclo-undecane.

References Cited

UNITED STATES PATENTS

| | | | |
|---|---|---|---|
| 2,457,224 | 12/1948 | Gresham | 260—2 |
| 3,027,352 | 3/1962 | Walling et al. | 260—67 |
| 3,256,246 | 6/1966 | Gutweiler et al. | 260—67 |
| 3,278,489 | 10/1966 | Bernstein et al. | 260—67 |
| 3,194,788 | 7/1965 | Küllmar et al. | 260—67 |
| 3,196,098 | 7/1965 | Machel | 260—67 XR |
| 3,174,948 | 3/1965 | Wall et al. | 260—45.8 |
| 2,071,252 | 2/1937 | Carothers | 260—2 |
| 2,110,499 | 3/1938 | Carothers | 260—54 |

FOREIGN PATENTS 1,271,297  7/1961  France.

WILLIAM H. SHORT, *Primary Examiner.*

L. M. PHYNES, R. T. LYON, *Assistant Examiners.*